United States Patent [19]

Yamada et al.

[11] 3,977,243

[45] Aug. 31, 1976

[54] TESTING MACHINE FOR TIRES ON IMITATION ROADS

[75] Inventors: Hirozi Yamada, Kyoto; Hiroshi Ogawa, Kodaira; Satoru Aono, Higashi-Murayama; Hironori Hirano, Akigawa, all of Japan

[73] Assignee: Bridgestone Tire Company Limited, Tokyo, Japan

[22] Filed: July 29, 1975

[21] Appl. No.: 600,024

[30] Foreign Application Priority Data

July 31, 1974 Japan.............................. 49-88246

[52] U.S. Cl.................................... 73/146; 73/126
[51] Int. Cl.²...................................... G01M 17/02
[58] Field of Search............. 73/146, 8, 9, 126, 123

[56] References Cited
UNITED STATES PATENTS

| | | | |
|---|---|---|---|
| 1,804,942 | 5/1931 | Macabee et al. ..................... | 73/126 |
| 1,848,457 | 3/1932 | Bendix................................ | 73/126 |
| 1,894,935 | 1/1933 | Bigelow.............................. | 73/126 |

Primary Examiner—Donald O. Woodiel
Attorney, Agent, or Firm—Sughrue, Rothwell, Mion, Zinn and Macpeak

[57] ABSTRACT

A testing machine for a tire on an imitation road in which a tire to be tested is urged against a crawler with the aid of a cantilever arm connected through a crosshead to a lifting and lowering disc engaged with screw threaded rods rotatably mounted in a machine frame. The crawler is composed of an endless chain and a road surface forming rods detachably mounted on the endless chain and replaceable by new rods made of different kind of material. In the crosshead are incorporated slip and camber angle setting mechanisms. Provision is made of load cells such as a strain gauge operatively connected to a tire supporting shaft, driving and driven shafts of the crawler and a guide rail of the crawler and for detecting a vertical load subjected to the tire, a torque for driving the crawler under various load conditions and a transverse component of force subjected to the crawler when the tire having a given slip angle or a camber angle is urged against the crawler.

14 Claims, 8 Drawing Figures

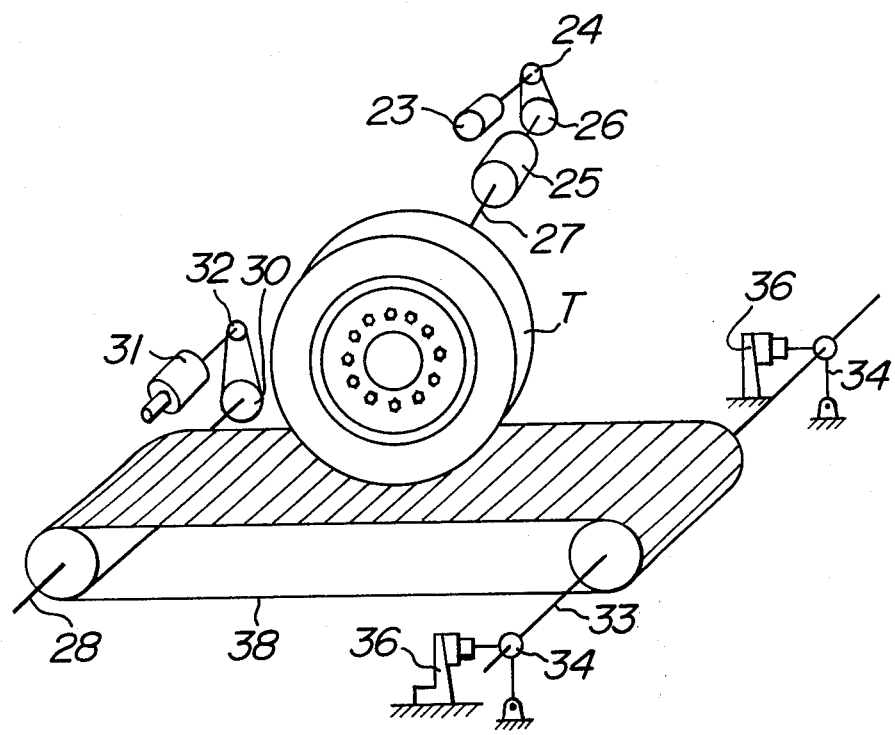
FIG_3

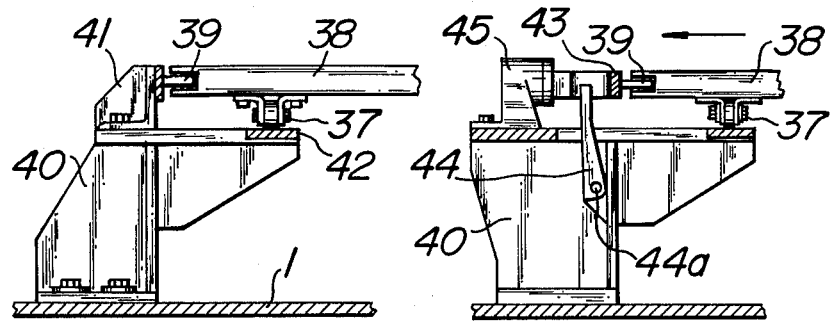
FIG_4  FIG_5
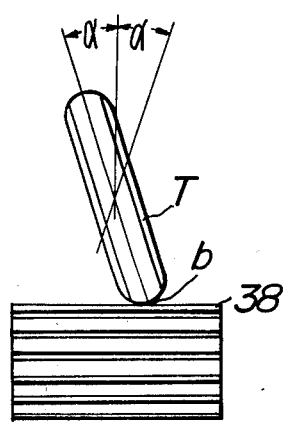 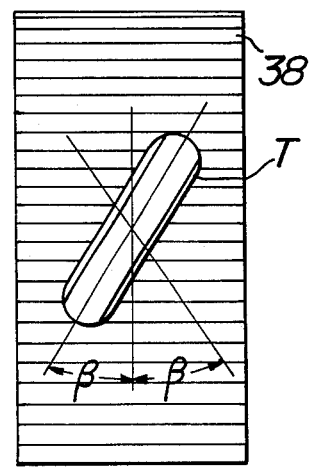
FIG_6  FIG_7

FIG_8
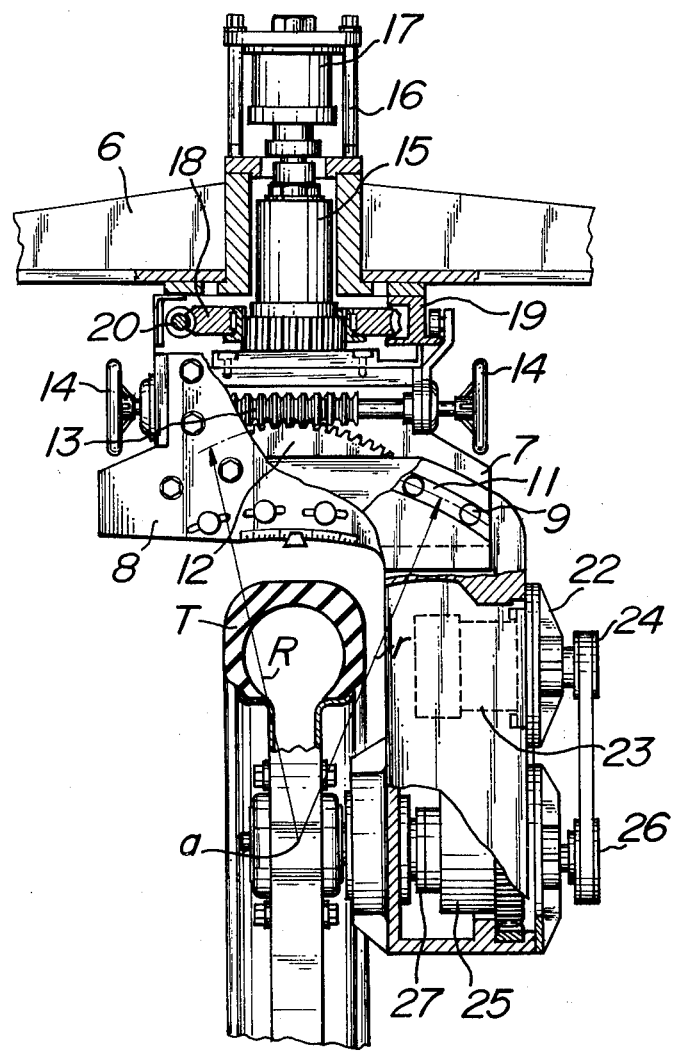

TESTING MACHINE FOR TIRES ON IMITATION ROADS

This invention relates to a testing machine for tires on imitation roads, which can urge an automobile tire against an imitation road surface, can apply driving and braking forces to the tire while it is running or set an attitute angle such as a slip angle or a camber angle and can measure various forces produced in the tire. Such testing machines heretofore proposed have made use of an imitation road surface composed of a reciprocative plate or a rotary cylinder having a large diameter. All of these testing machines can test a pneumatic tire under those conditions which are different from a real tire running condition and hence have disadvantages that values measured by these testing machines are not reliable and not approximate to practical values.

An object of the invention is to provide a testing machine for tires on imitation roads, which can obviate the above mentioned disadvantages which have been encountered with conventional testing machines.

A feature of the invention is the provision of a testing machine for tires on imitation roads, which can urge an automobile tire against an imitation road surface, can apply driving and braking forces to the tire while it is running or set an attitute angle such as a slip angle or a camber angle and can measure various forces produced in the tire, characterized by comprising 1. a crawler composed of an endless chain and road surface forming rods which are detachably secured to said endless chain and arranged side by side and supported by front and rear shafts;
2. a driving mechanism connected to said front shaft and for driving and running said crawler;
3. a crawler guiding mechanism arranged near said crawler, said guiding mechanism guiding said crawler so as to make it run in a plane at that position of said crawler against which is urged said tire;
4. a detecting mechanism provided for at least one of bearings for rotatably supporting said front and rear shafts of said crawler, said detecting mechanism detecting the driving and braking forces of said crawler; and
5. a load detecting mechanism located at any suitable position of said testing machine, said load detecting mechanism detecting the vertical load subjected to said tire.

The testing machine constructed and arranged as above described has a number of advantages. In the first place, the use of the crawler composed of an endless chain and road surface forming rods detachably secured to the endless chain ensures obtainment of measured values which are highly approximate to practical values. Secondly, it is possible to replace the road surface forming rods by another rods made of different kind of material so as to make the crawler similar to the practical road surface. Third, it is possible to selectively define a camber angle and a slip angle. Fourth, it is possible to rotate the tire to be tested at any selected speed independently of the running of the crawler and hence it is possible to measure various characteristics of the tire under its cambered or slipped condition. Finally, it is possible to provide various testing conditions as well as to enlarge a range to be measured, and as a result, a measured value which is highly approximate to the real value can be obtained, thereby giving data which can be used as a guide necessary for improving tires.

The invention will now be described in greater detail with reference to the accompanying drawings, wherein:

FIG. 3 is a perspective view showing a tire to be tested, a crawler and a detecting mechanism for detecting the driving and braking forces of the crawler;

FIG. 4 is an end elevation of a crawler guiding mechanism;

FIG. 5 is an end elevation of a modified embodiment of the crawler guiding mechanism shown in FIG. 4 and comprising a load cell for detecting a transverse thrust component subjected to the crawler;

FIG. 6 is an end elevation of the crawler and a tire to be tested having a camber angle, that is, an angle $\alpha$ between an inclined vertical center line of the tire and the vertical to the crawler;

FIG. 7 is a plan view of the crawler and a tire to be tested having a slip angle, that is, an angle $\beta$ between an inclined equatorial direction of the tire and the longitudinal center axis of the crawler; and FIG. 8 is an enlarged end elevation of the testing machine according to the invention, showing partly in section a camber angle setting mechanism, a slip angle setting mechanism, vertical load setting and detecting mechanisms, and a tire driving mechanism.

Figure 1:
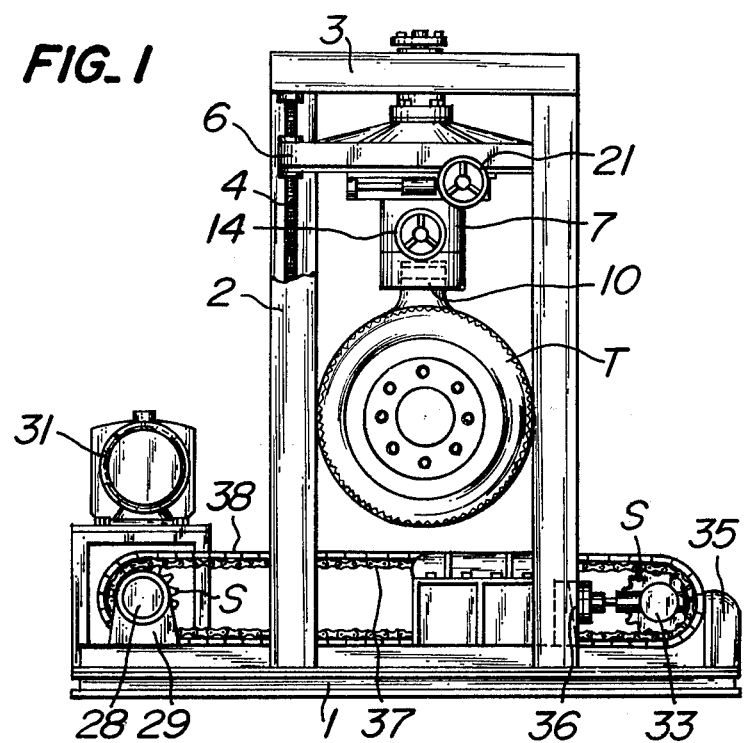
FIG. 1 is a front elevation of a testing machine according to the invention.

Referring to FIG. 1, reference numeral 1 designates a base plate, 2 illustrates four pillars mounted on the base plate 1 and connected at their upper ends with each other by means of a disc 3 so as to provide a machine frame.

Across the disc 3 and the base plate 1 are mounted four screw threaded rods 4, each extending through each of the four pillars 2. Each of these screw threaded rods 4 is connected through a pulley-belt connection or a chain wheel-chain connection (not shown) mounted at the lower end thereof to a driving device 5 shown in FIG. 2. The driving device 5 serves to rotate all of the screw threaded rods 4 in synchronism with each other.

Provision is made of a lifting and lowering disc 6 engaged through a tapped bushing (not shown) with each of the four screw threaded rods 4 and adapted to be lifted and lowered in response to the synchronous rotations of the screw threaded rods 4. The lifting and lowering disc 6 is formed at its lower center boss portion with a crosshead 7 which incorporates therein a slip angle setting mechanism and a camber angle setting mechanism to be described with reference to FIG. 8.

As shown in FIG. 8, to one side of the crosshead 7 is secured a side plate 8 with a gap formed therebetween. Provision is made of a cantilever arm 10 whose lower part encloses therein a shaft 27 for supporting a tire to be tested T and whose upper part is fitted in the gap formed between the crosshead 7 and the side plate 8 and rotatably supported by means of an arcuate groove 11 and a plurality of guide rollers 9. The arcuate groove 11 is formed on the cantilever 10 and has a radius of curvature r from a center a of the tire T. The guide rollers 9 are separated from each other and secured to and projected from the inside surface of the side plate 8 and slidably engaged with the arcuate groove 11. The top surface of the cantilever arm 10 is made flat. To this flat top surface of the cantilever arm 10 is secured a worm wheel rack 12 whose pitch circle has a radius of curvature R from the tire center a. A worm 13 for gearing with the rack 12 is supported by bearings provided at each end of the crosshead 7. The worm 13 is provided at each end with a handle 14 which can set a camber angle α shown in FIG. 6.

In this case, the center of rotation of the camber angle α is located at a point a of a vertical inclined center line of the tire T which makes contact with the road surface as shown in FIG. 8. Provision may be made of a tire position setting mechanism which can set that center line position b of the tire T which makes contact with the road surface such that a center of load subjected to the tire T passes through the center of the tire T as shown in FIG. 6.

On the crosshead 7 is mounted a stepped shaft 15 whose upper end is connected to a load cell 17 such as a strain gauge which is suspended from a stand 16 projected upwards from the boss of the lifting and lowering disc 6. The overall load inclusive of the cantilever arm 10, crosshead 7 and the like is supported from and subjected to the load cell 17.

The load cell 17 is constructed such that it is slightly displaceable in a vertical direction so as to enable it to detect the reaction force produced when the tire T is urged against the imitation road surface.

Reference numeral 18 designates a worm wheel for setting the slip angle β shown in FIG. 7. The worm wheel 18 is rotatably journaled in a guide holder 19 secured to the lower surface of the lifting and lowering disc 6 and is fitted around the stepped shaft portion 15 of the crosshead 7 by means of a special clamping ring. The special clamping ring is constructed such that rotation of the worm wheel 18 causes the crosshead 7 to rotate, and the special clamping ring gives no resistance against small lifting and lowering movements of the crosshead 7 due to the reaction force produced when the tire T is urged against the imitation road surface.

Reference numeral 20 designates a worm engaged with the worm wheel 18 so as to drive it which is rotatably journaled in bearings secured to the lower surface of the lifting and lowering disc 6. To one end of the worm 20 is secured a handle 21 shown in FIG. 1 which when operated causes the tire T to rotate around its vertical center line, thereby setting the slip angle β.

The cantilever arm 10 for supporting the tire T is provided therein with a driving motor 23 which is mounted on the inside surface of a supporting flange 22 secured to the outside surface of the cantilever arm 10. The driving motor 23 is connected through a pulley 24, a timing belt, a pulley 26 and a reduction gear 25 to a shaft 27 for supporting the tire T, and as a result, the tire T may be driven at variable number of rotations per minute thus defining conditions for testing slip ratios in a stepwise manner.

The slip ratios may be measured by means of a pickup (not shown) provided for the tire supporting shaft 27 and detecting the rotating speed of the tire supporting shaft 27 on the one hand and by means of another pickup provided for an imitation road surface driving shaft 28 and a driven shaft 33 and detecting the rotating speeds of these shafts 28, 33 on the other hand.

The real speed of the tire T may be precisely measured from the peripheral length of the tire T by taking the radius of the tire T under load into consideration, while the real speed of the imitation road surface may be precisely measured from an imaginary peripheral length by taking radial distances from the center axes of the driving shaft 28 and the driven shaft 33 to the imitation road surface, respectively.

As a result, those values of the slip ratios which are produced when a relative speed between the tire T and the imitation road surface becomes changed due to a driving or braking force subjected to the tire T and/or the imitation road surface can be measured.

As the rotating speed detecting pickup, use may preferably be made of a counter which makes use of a photoelectric tube or an electromagnetic type pulse generator.

Figure 2:
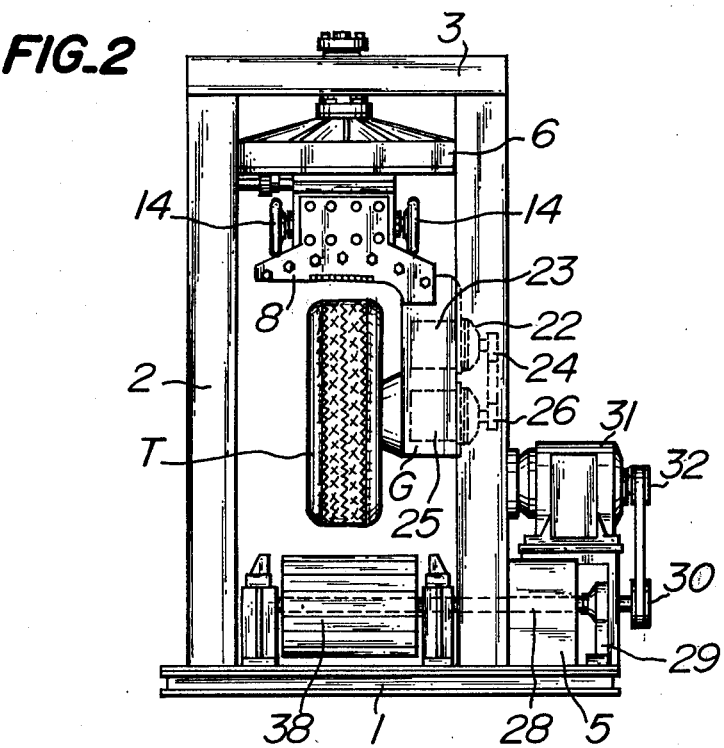
FIG. 2 is an end elevation.

A crawler composed of an endless chain and road surface forming rods according to the invention will now be described. As shown in FIGS. 1, 2 and 3, the crawler is driven by a driving shaft 28 rotatably journaled in a plurality of stationary bearings 29. The driving shaft 28 is connected through a pulley 30 secured to one end of the driving shaft 28, a timing belt and a pulley 32 to a reduction gear 31 directly connected to a motor (not shown). Thus, the driving shaft 28 may be driven at various speeds.

A driven shaft 33 is rotatably journaled in rocking vertical bearings 34 as shown in FIG. 3. Each of these bearings 34 is made rotatable at that end which is connected to the driven shaft 33 in a direction of force acting on a load cell 36 around another end. Reference numeral 35 (FIG. 1) designates a stopper stand for limiting the outward movement of the rocking vertical bearing 34. As a result, the load cells 36 can detect the driving force or driving torque of the crawler 38 under various different load conditions.

The load cells 36 may also be associated with the driving shaft 28 or with both the driving shaft 28 and driven shafts 33 or with the tire supporting shaft 27 through a torque meter (torque load cell). In principle, the driving and braking forces of the tire T can be defined irrespective of the position of the load cell in the driving mechanism.

As shown in FIG. 1, the crawler 38 is brought into engagement with sprocket wheels S secured to the driving shaft 28 and the driven shaft 33, respectively. The crawler 38 is composed of at least two rows of endless chains 37 arranged in parallel with each other and supported by front and rear sprocket wheels S, S. A number of rods 38 for forming a road surface are arranged side by side and are detachably secured to the endless chain 37 so as to be replaceable by new ones made of various kinds of materials. The road surface forming rods 38 are arranged adjacent with each other in a direction perpendicular to the lengthwise direction of the endless chain 37 so as to make substantially no gap between the rods 38 forming the road surface against which is urged the tire T. The upper surface of each rod 38 is made flat.

Each of these road surface forming rods 38 is provided at its side edge with a roller 39 as shown in FIG. 4. The roller 39 slidably makes contact with a guide rail 41 secured to a stand 40 mounted on the base plate 1. The guide rail 41 serves to limit the movement of the road surface forming rod 38 in its widthwise direction. The lower part of the endless chain 37 slidably makes contact with a rail 42 secured to a bracket projected from the stand 40 so as to prevent a hanging down movement of the crawler 37, 38.

A link for connecting adjacent chain elements of the endless chain 37 is made rotatable along the rail 42. As a result, even when the crawler 37, 38 travels along the rail 42 with the tire T urged against the crawler 37, 38, the friction between the crawler 37, 38 and the rail 42 becomes negligibly small. The crawler guiding mechanism constructed as above described ia capable of running at least that position of the crawler 37, 38 against which is urged the tire T in a horizontal direction.

As shown in FIG. 5, provision is made of a rail piece 43 which is obtained by dividing the guide rail 41 and which slidably makes contact with the plurality of roller 39. The rail piece 43 is pivotally supported by a free end of a lever 44 whose lower end 44a is pivotally supported by the stand 40. The rail piece 43 is operatively connected to a load cell 45 secured to the top of the stand 40. As a result, the load cell 45 is capable of detecting a transverse thrust component shown by an arrow in FIG. 5 and subjected to it from the crawler 37, 38 through the rail piece 43. The transverse thrust component is produced from the tire T having the camber angle α or the slip angle β and urged against the crawler 37, 38.

At least one load cell 45 may be mounted on the stand 40 and may be opposed through the rail piece 43 to either or both side edges of the crawler 37, 38.

The testing machine per se constructed as above described may be connected to a control device, a calculating device and a recording device (not shown).

The testing machine according to the invention may be used for various testing purposes which are mainly divided into three tests, that is, I Tire compression test, II. Tire running compression and rotation test, and III. Tire running compression, driving and braking test.

The operation of the testing machine according to the invention will now be described with reference to these three tests.

I. Tire Compression Test

At first, the crawler 37, 38 is stopped. Then, the synchronous driving device 5 is operated to rotate the screw threaded rods 4 so as to lower the lifting and lowering disc 6, thereby urging the tire to be tested T against the crawler 37, 38. A reaction force thus produced is transmitted to and detected by the load cell 17 to determine the testing load subjected to the tire T, thereby measuring deflection of the tire T.

The lowering speed of the tire T may be changed by means of a reduction gear (not shown) provided for the synchronous driving device 5 for rotating the screw threaded rods 4.

The size of the tire T and the compressive load subjected thereto may be changed within a certain range.

Tire Running Compression and Rotation Test

The handle 14 is rotated to incline the vertical center line of the tire T from the vertical to the crawler 37, 38 to define the chamber angle α shown in FIG. 6 within a certain range, while the handle 21 is rotated to rotate the tire T around its vertical center axis to define the slip angle β shown in FIG. 7 within a certain range. In addition, the motor directly connected to the reduction gear 31 is energized to change the running speed of the crawler 37, 38. As a result, it is possible to define a number of testing conditions.

In the present test II, the deflection of the tire T caused by the compression load subjected thereto may be measured in the same manner as in the case of the previous test I.

The torque for driving the crawler 37, 38 under various loads can be detected and measured by means of the load cells 36 shown in FIGS. 1 and 3.

In the case of driving the crawler 37, 38 with the tire T having a given camber angle α or a given slip angle β urged against it, the transverse component of force shown by an arrow in FIG. 5 and acting upon the crawler 37, 38 can be detected by the load cell 45.

III. Tire Running Compression, Driving and Braking Test

A relative relation between the variable running speed of the crawler 37, 38 effected by means of the motor connected to the reduction gear 31 and the minute rotating speed of the tire T effected through the reduction gear 25 by means of the driving motor 23 makes it possible to define various test conditions.

The testing load subjected to the tire T and deflection thereof may be measured in the same manner as in the case of the tire compression test I.

The braking test may also be effected by lowering the lifting and lowering disc 6.

In the same manner as in the case of the tire compression test I, a number of driving and braking forces and driving and braking speeds can be defined. In addition, if one of the road surface forming rods 38 constituting the crawler 37, 38 is replaced by another one made of different kind of material or if small load cells for detecting forces acting in upward and downward directions, in forward and rearward directions as well as in left and right directions, respectively, are arranged side by side and embedded in the flat road surface forming rods 38, it is possible to enlarge the testing range. In this case, provision may be made of a small load cell which can detect forces acting in upward and downward directions, in forward and rearward directions as well as in left and right directions and this load cell may be embedded in one of the flat road surface forming rods 38.

As stated hereinbefore, the testing machine according to the invention has a number of advantages. In the first place, an imitation road surface is formed by a crawler consisting of an endless chain and road surface forming rods and these rods are arranged to run along a plane and can be replaced by a new one made of different kind of material so that a value highly approximate to a real value can be measured and a number of various test conditions can be defined. Secondly, it is possible to detect a vertical load subjected to a tire to be tested, detect a torque for driving the crawler under various load conditions and detect a transverse component of force subjected thereto when the tire having a given slip angle or a camber angle is urged against the crawler. Third, it is possible to extremely shorten the length of the crawler and to make its running surface plane. Finally, it is possible to continuously measure the above mentioned values.

Thus, the invention provides an economical way of compacting a testing machine and significantly improving the testing faculty thereof and can be applied effectively to measure a reliable value which can provide precisely the movement and change of an automobile tire during its running and can also provide data which can be used as a guide necessary for improving tires.

What is claimed is:

1. A testing machine for urging an automobile tire against an imitation road surface, comprising:

a. a crawler comprising an endless chain supported by front and rear shafts and a plurality of flat rods arranged side by side and detachably secured to said endless chain to form an imitation road surface;

b. a mechanism connected to one of said crawler shafts for driving and braking said crawler;

c. a crawler guiding mechanism for guiding said crawler to run in a plane at that position thereof against which said tire is urged;

d. bearing means for rotatably supporting said front and rear shafts of said crawler, and a detecting mechanism provided for at least one of said bearing means for detecting the driving and braking forces of said crawler;

e. a machine frame extending over and above said crawler, f. a disc mounted in said machine frame for vertical movement therein, g. a crosshead rotatably mounted to said disc, h. a cantilever arm rotatably depending from said crosshead and supporting a tire to be tested, i. means for raising and lowering said disc to thereby urge said tire against said crawler, j. means for rotatably adjusting said crosshead relative to said disc to thereby set a slip angle for said tire, and k. means for rotatably adjusting said cantilever arm relative to said crosshead to thereby set a camber angle for said tire.

2. A testing machine as claimed in claim 1, wherein said crawler comprises at least two rows of endless chains arranged in parallel with each other, said road surface forming rods being secured to said endless chains and arranged adjacent to each other in a direction perpendicular to the lengthwise direction of the endless chain so as to minimize gaps between the rods.

3. A testing machine as claimed in claim 1 further comprising a rail arranged below said endless chain, said rail causing at least that position of said crawler against which said tire is urged to run in a horizontal direction.

4. A testing machine as claimed in claim 3, wherein chain elements of said endless chain are connected through a rotatable link with each other, said rotatable link reducing the running resistance of said crawler when it is run on said rail.

5. A testing machine as claimed in claim 1, wherein said crawler guiding mechanism comprises a roller provided for each side edge of each rod, and a guide rail slidably supporting said rollers and located at that position of said crawler against which a tire being tested is urged.

6. A testing machine as claimed in claim 5, wherein said guide rail is divided along its lengthwise direction into sections to form rail pieces, and further comprising a load cell secured to a stand provided for said testing machine, said load cell detecting a transverse thrust component applied to it from said crawler through one of said rail pieces, said one of said rail pieces being movably mounted on said stand in response to said transverse thrust component.

7. A testing machine as claimed in claim 1, wherein said detecting mechanism comprises a load cell arranged near a bearing for rotatably supporting one of said crawler shafts, said load cell being operative in response to a force applied to said bearing in a horizontal direction in parallel with the running direction of said crawler; and a rocking vertical bearing having one end connected to said shaft and rotatable in a direction of force acting on said load cell about another end, said rocking vertical bearing rotatably supporting each end of said shaft.

8. A testing machine as claimed in claim 1, wherein said detecting mechanism for detecting said driving and braking forces comprises a torque meter incorporated into a shaft for driving said crawler.

9. A testing machine as claimed in claim 1 further comprising a pickup provided for each of a tire rotating shaft and said crawler supporting shafts, said pickups detecting the rotating speed of each of said shafts.

10. A testing machine as claimed in claim 1 wherein said machine frame has screw threaded rods rotatably mounted therein, said disc being engaged with said screw threaded rods and being raised and lowered by the rotation thereof, and further comprising a worm wheel rotatably journaled in said disc and attached to said crosshead, and a manually operated worm engaged with said worm wheel to implement the rotational adjustment of said crosshead.

11. A testing machine as claimed in claim 1 further comprising a side plate secured to one side of said crosshead with a gap formed therebetween, said cantilever arm being slidably supported by said crosshead, an arcuate groove formed on said cantilever arm and having a radius of curvature from a center of said tire, guide rollers separated from each other and secured to and projected from the inside surface of said side plate and slidably engaged with said arcuate groove, a worm wheel rack secured to the top flat surface of said cantilever arm and having a pitch circle whose center is on the tire center, and a manually operated worm engaged with said worm wheel rack to implement the rotational adjustment of said cantilever arm.

12. A testing machine as claimed in claim 1 wherein said machine frame has screw threaded rods rotatably mounted therein, and further comprising a synchronous driving device connected to all said screw threaded rods whereby said disc is raised and lowered by rotating said screw threaded rods by said synchronous driving device.

13. A testing machine as claimed in claim 1 further comprising a vertical load detecting mechanism comprising a stepped shaft mounted on said crosshead, a stand projected upwards from the center of said disc, and a load cell connected to the upper end of said stepped shaft and suspended from said stand.

14. A testing mechanism as claimed in claim 1 further comprising a tire driving mechanism comprising a driving motor enclosed in said cantilever arm and connected through pulleys, a timing belt carried by said pulleys, a reduction gear and a supporting shaft to said tire.

* * * * *